July 29, 1952  H. S. CAMPBELL  2,604,953
DAMPING DEVICE FOR ROTATIVE WING AIRCRAFT
Filed Aug. 16, 1946  2 SHEETS—SHEET 1
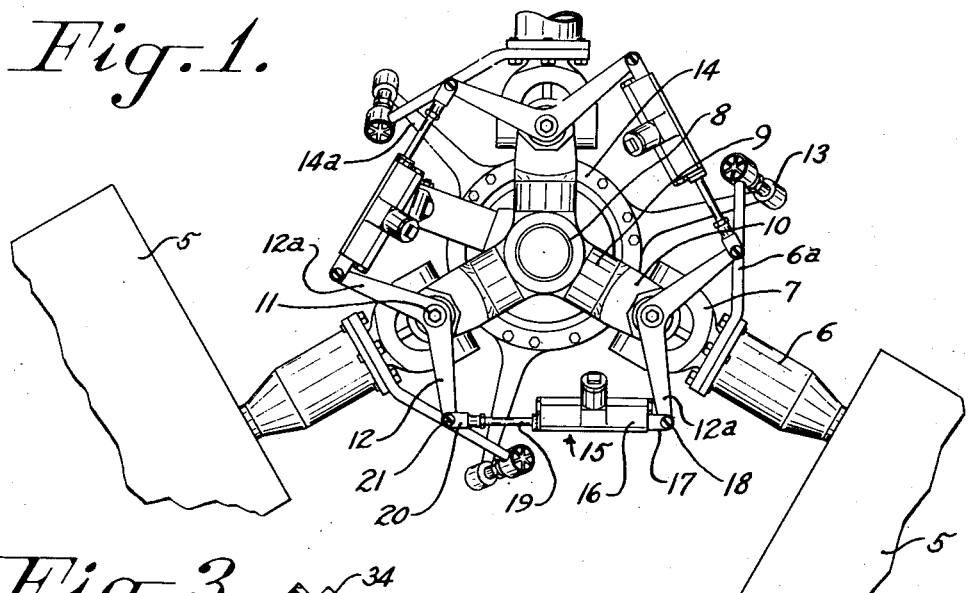
Fig. 1.
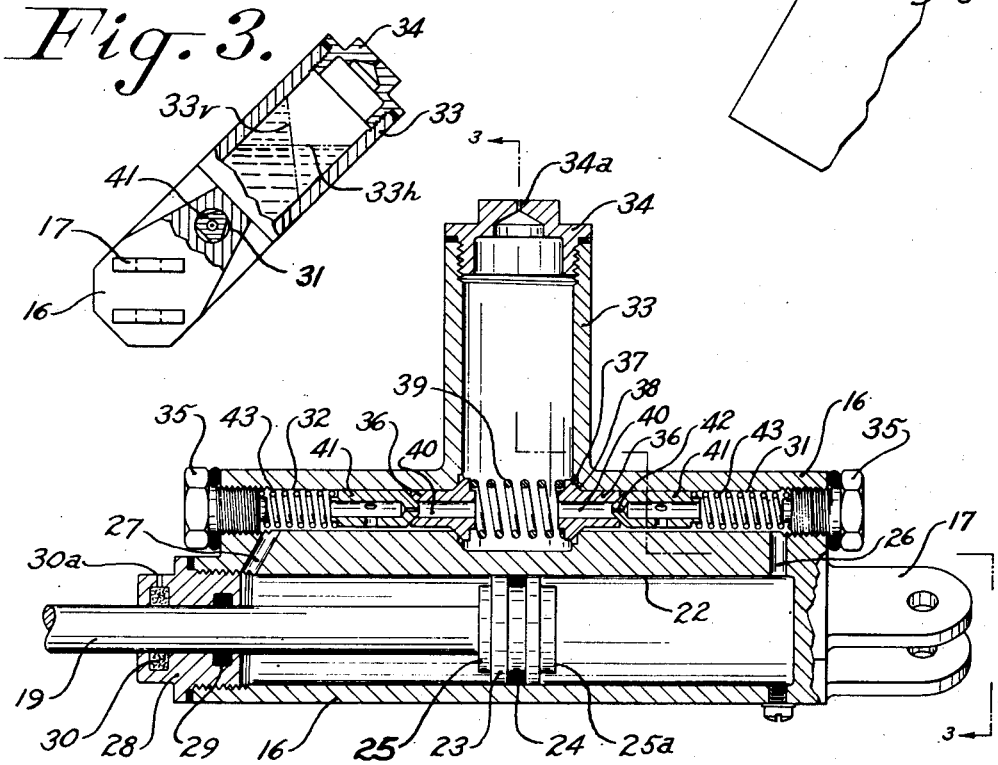
Fig. 3.
Fig. 2.
INVENTOR
HARRIS S. CAMPBELL
BY Clyde Frye
ATTORNEYS July 29, 1952     H. S. CAMPBELL     2,604,953
DAMPING DEVICE FOR ROTATIVE WING AIRCRAFT
Filed Aug. 16, 1946     2 SHEETS—SHEET 2
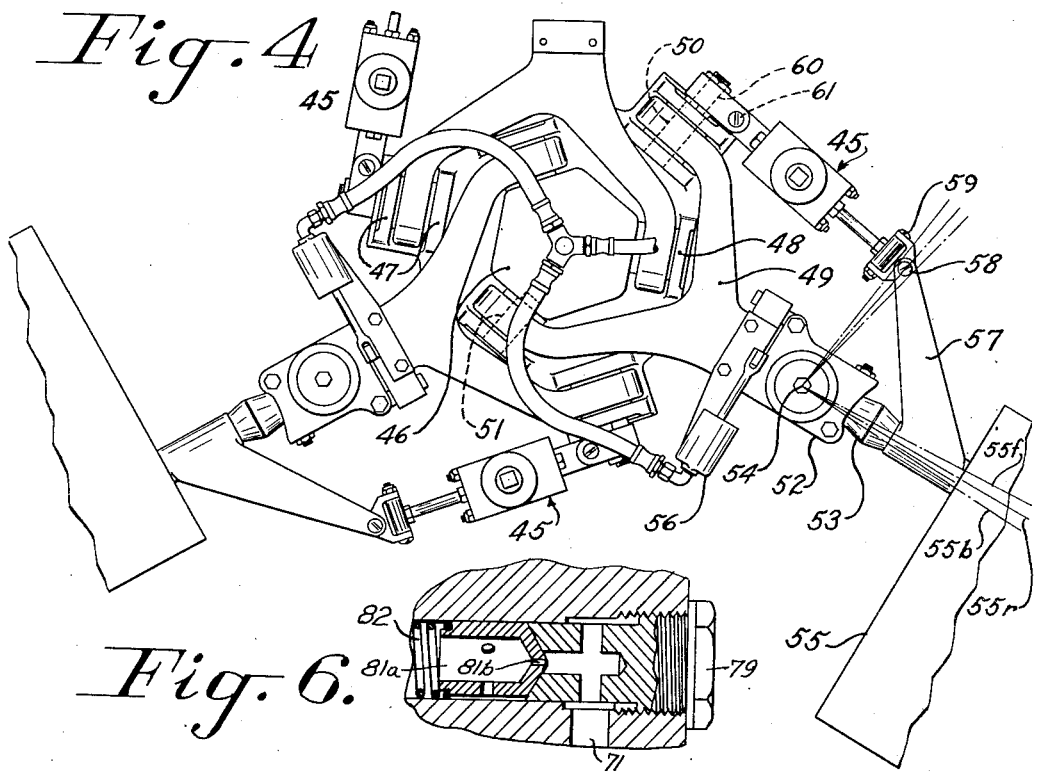
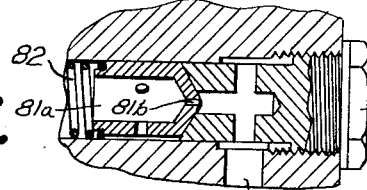
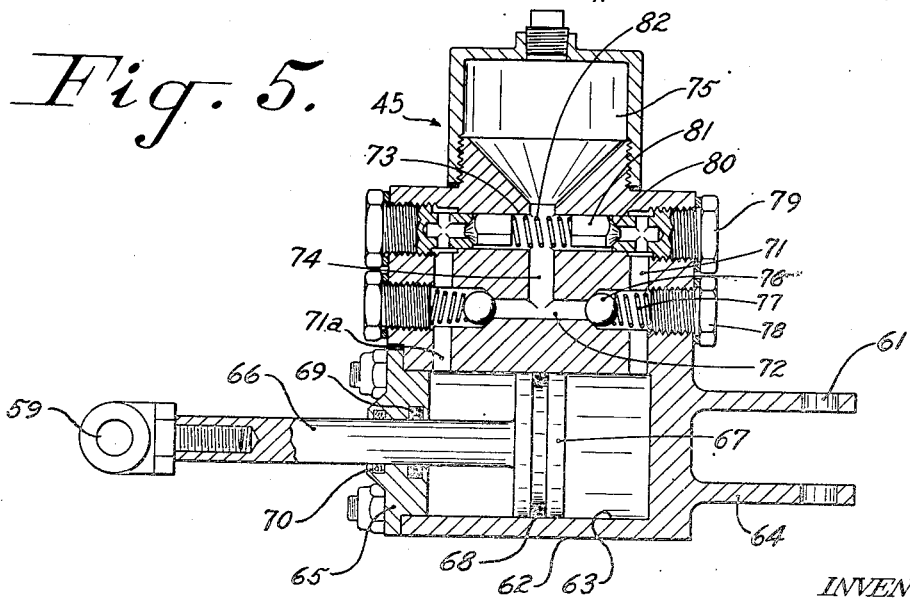
INVENTOR
HARRIS S. CAMPBELL
BY
ATTORNEYS Patented July 29, 1952

2,604,953

UNITED STATES PATENT OFFICE 2,604,953

DAMPING DEVICE FOR ROTATIVE WING AIRCRAFT

Harris S. Campbell, Bryn Athyn, Pa., assignor to The Firestone Tire & Rubber Company, Akron, Ohio, a corporation of Ohio Application August 16, 1946, Serial No. 690,893

7 Claims. (Cl. 170—160.55)

1

This invention relates to rotary wing aircraft and is more particularly directed toward damping mechanism for the control of rotor blade movement.

In many types of rotary wing aircraft a plurality of blades are used, these blades being attached to a rotating part of the rotor hub by means of pivots. Horizontal or flapping pivots are used to permit motions by the individual blades in a direction perpendicular to the plane of rotation. Vertical or drag pivots are used in the attachment of the blades to allow the blades to move forwardly or rearwardly in the plane of rotation from the radial position. Often the blades are also mounted to permit each blade to change pitch for purposes of control.

With a rotor construction in which the rotor blades are connected to the hub by means of drag pivots, the blades are free to move to positions in which they are out of pattern, that is, the spacing between adjacent blades may vary during operation. At certain speeds of rotation of the rotor when blades are mounted in this fashion it is possible to develop a critical or unstable condition of operation for example, when bringing the rotor up to speed prior to flight. Such critical frequencies are not necessarily the same as the rotational speed, since the elastic properties of the supporting structure, chiefly the landing gear, are also involved. In order to prevent the development of such unstable motions it is necessary to provide for damping in both the landing gear structure and in the rotor blade mounting. When sufficient damping is provided at these points the blade motions are prevented from being developed or are controlled at sufficiently small amplitude that they do not transmit detrimental motions to the aircraft itself.

It is an object of the present invention to provide an improved type of hydraulic rotor damping mechanism to control the instability discussed above.

As mentioned previously the critical frequencies usually develop during the operation of starting and bringing the rotor up to speed while on the ground prior to flight or during slowing down of the rotor after landing. Usually the rotational speed at which such instabilities tend to occur are considerably lower than the normal flight rotational speeds. When a hydraulic damping device is used at the blade pivot for the control of such motions, sufficient damping must be provided to be effective at the critical rotational speeds. At higher rotational speeds, such as during normal powered flight or at maximum

2

R. P. M. during autorotational operation at ceiling, the damping devices are capable of producing greatly increased damping loads at their normal displacements. This is due to the fact that the hydraulic damping force is developed by the forcing of hydraulic fluid through an orifice. The damping force varies in proportion to the square of the volume delivered through the orifice in a given interval. Thus it will be evident that the loads applied to the damping mounting structure at normal or maximum operation may exceed by several times the damping force required at the instability condition of operation. Such high forces may unduly restrict the motions of the blades during flight and develop bending moments in the connecting parts which may be excessive and objectionable, particularly from the point of view of smooth operation and the development of fatigue stresses.

It is a further object of the present invention to provide an improved form of hydraulic damper suitable for use with aircraft rotors in which the damping capacity is limited to prevent the building up of excessive forces.

Another object of the invention is to provide a compact piston type hydraulic unit having combined orifice and relief valve mechanism adapted to occupy a minimum of space and provide a damper of low weight.

A still further object of the invention is to provide a damper construction having an improved form of assembly and including individual reservoir means for each damping device thereby providing a unit which is readily disassembled for service and inspection.

How the foregoing and other objects and advantages of the invention are accomplished will be evident by reference to the accompanying drawings in which—

Figure 1 is a plan view of a rotor hub illustrating the attachment of the rotor blades thereto and the location and mounting of the damping devices.

Figure 2 is an enlarged longitudinal sectional view of one of the damping devices shown in Figure 1.

Figure 3 is a view partly in section, taken along the lines indicated by arrows 3—3, Figure 2, and showing the damper in proper mounted relationship to the horizontal.

Figure 4 is a plan view of an alternative form of rotor hub showing a different type of hydraulic damper.

Figure 5 is an enlarged sectional view of one of the damper units illustrated in Figure 4.

Fig. 6 is an axial sectional view of a modified valve body for a damper unit as in Fig. 5.

Referring to Figures 1 to 3, the inner portion of each rotor blade 5 is connected by the blade sleeve structure 6 and fork 7 to the rotor hub. The rotor hub includes a central axis structure 8 to which arms 9 are fastened. Each arm 9 terminates in a fork 10. Each hub fork 10 supports a vertical pivot axis structure shown at 11 to which structure the arms 12 and 12a are rigidly connected so that they move with the blade as it swings relative to the radial position. The vertical pivot structure is adapted to be engaged by the blade fork 7 through which a horizontal pivot extends to permit flapping motions of the blades.

In the present configuration the fork 7 is provided with a radially extending spindle on which bearings are provided for the support of sleeve 6. These bearings retain the blades against centrifugal force and permit pitch change movements to be made. For the purpose of controlling these pitch movements an arm 6a is connected to the blade terminal 6, the arm 6a being controlled by push rod 13 which connects by means of arm 14a to swash plate 14. The swash plate may be moved in a fashion to provide for either simultaneous change of pitch for all the blades or cyclic change of pitch for control purposes.

Connected between the end of the arm 12 of one blade and the arm 12a of an adjacent blade is a piston type hydraulic unit generally indicated at 15. Attached to the housing 16 at one end are ears 17 to provide a pivotal connection 18 with the end of arm 12a. A piston rod 19 projects from the housing 16 and terminates in an adjustable fork end 20 to connect to arm 12 by means of pivot 21.

The details of construction of the hydraulic unit 15 are clearly illustrated in Figure 2. Here it will be seen that the piston rod 19 extends into the cylindrical bore 22 inside the casing or housing 16. A piston member 23 is provided at the end of rod 19 with a groove having suitable dimensions for retaining a sealing ring 24. The piston 23 is provided with shoulders 25 and 25a of reduced diameter. These shoulders are proportioned to contact the ends of the cylinder while still allowing free access of the fluid in the cylinder to the holes 26 and 27 at each end of the cylinder.

It will be observed that one end of the cylinder is closed by means of threaded plug 28 having a suitable aperture to allow sliding movements of the piston rod 19. A hydraulic seal 29 is mounted in the plug 28 and a wiping or oiling ring 30 is provided to prevent entrance of dirt which might interfere with free sliding of the rod. An oil hole 30a is provided to allow periodic oiling of the seal 30 which may be of felt or other suitable material. It will be noted that the plug 28 is of relatively great length in order to provide a considerable bearing area in contact with the piston rod 19.

Channels 26 and 27 lead from each end of the bore 22 into bored channels 31 and 32 which lead from each end of the unit to a central reservoir 33. Reservoir 33 projects from the main body 16 and as will be observed in Figures 1 and 3, lies at an angle of approximately 45 degrees with respect to the vertical when in position on the rotor. This relative positioning of the reservoir provides for covering the bottom outlets from the reservoir to channels 31 and 32 with hydraulic fluid when the rotor is stationary or when the rotor is operating at speed. When the rotor is stationary or operating at slow speeds the level of the fluid will be approximately horizontal as indicated by the line 33h since the main force acting upon it is the gravitational force. When the rotor is operating at high speed the centrifugal forces acting on the hydraulic fluid in reservoir 33 predominate so that the fluid tends to move to the outboard side of the reservoir with the result that the fluid level may be almost vertical as indicated by the line 33v in Figure 3. Under either condition the inclined position of the reservoir assures that the fluid will cover the outlets. A lid 34 which may have a vent 34a is provided for filling reservoir 33.

At the ends of channels or bores 31 and 32 there are plugs 35 provided to permit access to the bores for assembling the various parts of the hydraulic valves. In each of the bores 31 and 32 there is provided a valve part 36 with a shank portion adapted to support the valve in the bore 31 or 32. Each valve 36 is provided with an enlarged head having tapered seat 37 adapted to contact the seat 38 at the inner end of bores 31 and 32, respectively. A spring 39 is proportioned to fit between valves 36, 36, to urge them into contact on their respective seats. Each valve part 36 is provided with a central channel 40, one end of which is beveled to form a seat suitable for contact with the tapered end of poppet part 41. An orifice 42 is located in the end of poppet 41 and connects with bore 40 in the valve 36. A light spring 43 reacts between the plug 35 and the poppet 41 to retain it in operative position.

It will be seen that an external channel is provided at certain points on the circumference of poppets 41 and valves 36. This is illustrated in Figure 2 by the space at the lower side of the valves 36 and poppets 41 where they are clear of the surface of bores 31 and 32. Such a channel may be provided by machining suitable flat surfaces on the cylindrical portions of the valves 36 and poppets 41. This will be more readily seen in Figure 3 where the three flat surfaces on poppet 41 are clearly illustrated.

The operation of the damping devices illustrated in Figures 1 to 3 is as follows. When the piston is moved to the right, pressure is built up in the right hand end of the cylinder and flow occurs through channel 26 and bore 31. Orifice 42 in poppet 41 controls the flow. The pressure developed depends upon the speed of motion of the piston 23 and builds up with increased speed due to the restriction to flow offered by orifice 42. Upon exceeding a given pressure, which pressure is determined by the capacity of spring 39 and the area of channel 31, the valve part 36 is caused to move against the force of spring 39. This movement causes valve 36 to lift from the seat 38 and thus permits additional free flow around the outside of poppet 41 and valve 36 thereby limiting the pressure developed by the piston to a predetermined value.

During the motion of the piston to the right, reduced pressure is produced in the cylinder to the left of piston 23. In order to keep this part of the cylinder full of fluid, flow occurs from the reservoir 33 through the channels 32 and 27 into the main cylinder. This flow is comparatively unrestricted since the capacity of light spring 43 is extremely low and as soon as a lower pressure develops in channel 32 than in the reservoir 33, flow occurs without appreciable restriction through the channel 40 of valve 36, past the seat of poppet 41 which has lifted off due to the pressure variation. Free flow is permitted around the outside of poppet 41 to channel 32 and channel 27. Breather hole 34a in cap 34 assures atmospheric pressure in the reservoir at all times.

Reverse motion of the piston 23 reverses the action of the valves 36 and the poppets 41. The presence of the piston rod in one end of the cylinder changes slightly the piston rod force at which the valve 36 in bore 32 operates as compared to the force required for valve 36 in bore 31. These forces, however, are sufficiently close to provide no practical disadvantage during operation. The variation of the volume for a given piston movement is automatically taken care of since the space on the opposite side of the piston from the direction of movement is filled by inflow from the reservoir.

Motion of piston 23 in the bore 22 is produced at any time that a rotor blade moves out of regular pattern so that the angular spacing between the blades is unequal. As previously mentioned in connection with the objects of this invention, this may occur due to rotor instabilities which develop at critical speeds during starting or stopping the rotor while on the ground. The slight motion of the blades which develops under this condition produces a damping force in the hydraulic dampers and thus effectively prevents undesirable increase of the instability motions. During flight out-of-pattern motions occur when there is transverse airflow through the rotor. This condition exists during forward flight of the craft. Under extreme conditions of flight it is possible for the blades to move considerably from radial position and, although the angular amplitude is small, the rapidity of change which occurs once per revolution may be such that the orifice 42 may develop pressures in the dampers which are greater than the pressures required for damping action at the critical operational speeds on the ground. Under these conditions the valves 36 function to relieve the pressure and prevent it from reaching a value which might cause detrimental forces and moments in the blade and hub structure.

The particular arrangement of dampers illustrated in Figure 1 has special advantages inasmuch as there are two dampers acting on each blade. Thus in the event of failure or partial failure of one damper the motions of all three blades may still be damped by the remaining two dampers due to the geometry of this arrangement. Further the damping capacity of each unit when attached between the blades in this fashion may be less than a damper used between a blade and the hub structure. This is due to the fact that the motions of the adjacent blades are related in such a fashion that they are usually moving either toward each other or away from each other with the result that for a given blade displacement there is a greater damper motion than occurs for the same blade displacement when the damper is mounted between the blade and the hub. This increased damper movement results in greater damper efficiency so that lighter dampers may be used to provide the required damping capacity.

Figures 4 and 5 illustrate another form of damper mechanism. Figure 4 discloses a hub construction having rotor blades attached thereto, the drag motions of which are controlled by hydraulic damper units indicated generally by numeral 45. Here it will be observed that a central hub member 46 equipped with lugs 47 and 48 supports extension forks 49. There are three forks 49, one for each of the three blades of the rotor. Forks 49 are attached to the hub member 46 by means of flapping pivots indicated at 50 and 51.

At the outer end of each fork 49 a terminal fitting 52 is attached. A blade root member 53 is connected to terminal fitting 52 by means of a vertical pivot having its axis at 54. Movement about the vertical pivot axis 54 during rotation of the rotor is permitted through a limited angle, stops being provided to control the amplitude of maximum movement.

The outer extension fitting 52 is attached to the fork 49 in a suitable manner, such as by a threaded connection, so that it can change its position rotationally about an axis coincident with the axis of the rotor blade 55. This change of position is controlled by means of stops to provide for a low pitch position and a normal pitch position. The actuation of the member 52 to one position or the other is accomplished by the use of a hydraulic cylinder 56. This particular blade pitch changing mechanism is not directly concerned with the damping device of the present invention except that the presence of this mechanism requires the mounting of the damper to accommodate the pitch changing motions.

An arm 57 connected to the root of the blade 55 extends outwardly to a point opposite the axis of the fork 52. The end of this arm is pivoted by a vertical pivot 58 to one end of damper device 45. A secondary pivot 59 is provided to allow the change in position of arm 57 which occurs during the pitch change movements described above. The opposite end of the damper unit 45 is supported on a horizontal pivot 60 and also a vertical pivot 61 which accommodates movements of the damper when the blade moves about drag pivot 54.

The damper unit, as is more clearly illustrated in Figure 5, has a casing 52 in which there is a main cylindrical opening 63. At one end of the casing 62 is a pair of lugs 64 in which the pivot support 61 is located. At the other end of the casing a cap member 65 is provided through which piston rod 66 extends. The inner end of piston rod 66 supports the piston member 67 which incorporates seal 68. Another hydraulic seal 69 is mounted in the cap member 65 and engages the piston rod 66. An additional wiper seal 70 is provided around piston rod 66 to protect seal 69 from dirt and the like.

Two channels 71 and 71a are located so as to lead from either end of the cylinder 63 upwardly to meet transverse channels 72 and 73. Channels 72 and 73 are connected by means of a vertical opening 74 to the reservoir chamber 75. A ball check valve 76 with its spring 77 is located at either end of channel 72 in a position to allow flow from the reservoir into channels 71 and 71a and to prevent flow from channels 71 and 71a to the reservoir through channel 74. Cap member 78 is threaded into casing 62 in a fashion to close the opening and support the spring 77 in position.

At each end of the channel 73 there is a threaded plug 79 having its inner end drilled to join channel 73 with channels 71 and 71a, and form a seat 80 against which each poppet valve 81 may seat. Spring 82 is located between the two poppets 81 and urges them against their respective seats. Spring 82 is proportioned to retain each poppet 81 in seated position until a predetermined pressure has been developed in channel 71 or 71a causing one of the poppets 81 to open and permit flow from the corresponding cylinder chamber. If desired an orifice may be provided through the poppets 81 to allow a restricted flow at pressures below the opening pressure. This is illustrated in Fig. 6 wherein poppet valve 81a, corresponding generally to valve 81 of Fig. 5, has a restricted axial orifice 81b in its seating end.

With this construction, the damping device is adapted to be double acting. A compression load on the damper unit will build up a pressure in the right hand end of the chamber and upon reaching sufficient magnitude the compression load will cause movement, since the poppet 81 will open at the predetermined pressure and allow flow through channel 71 to the reservoir. During motion of the piston to the right substantially unrestricted flow from the reservoir to the left hand end of the cylinder is permitted through channels 74 and 72 and then through the left hand check valve 76 to channel 71a. A tension load on the damper unit will cause motion of the piston to the left and thus cause operation of the poppets and check valves in the opposite sense to that just described.

During flight operation each rotor blade may move from radial position 55r to a forward position represented by centerline 55f and a lag position represented by centerline 55b. This movement of the blade causes directly related motions in the damper mechanism. As has previously been discussed, during starting or stopping operations on the ground the rotor passes through critical speeds and similar motions of the blade about pivot 54 may occur. These motions are damped by means of the energy absorbed by the damping device 45 and are thus prevented from developing to an undesirable amplitude. The dampers illustrated in Figure 4 control each of the blades individually, since the damping restraint is applied between the blade to which arm 57 is attached and the hub to which the inner end of the damper is attached. This arrangement of dampers provides for blade to hub damping as compared to the arrangement shown in Figure 1 where blade to blade damping is illustrated. The configuration of the hub and blade connection in Figure 4 is such that the flapping pivot is offset from the drag pivot, the latter being considerably outboard the flapping pivot. The mounting of the damper is arranged to dampen only the drag pivot movements, the damper being supported in a fashion to allow free blade movements in the flapping sense.

From the foregoing description, it will be evident that I have provided a simple form of hydraulic damping device which is particularly effective for use with pivotally mounted blades on rotative wing aircraft. The arrangement of valves and poppets to provide a compact and light weight unit having safety features to prevent the development of excessive bending moments in blade structures provides a unit having increased value for this damping function. The particular arrangement of orifice within the poppets and pressure relief mechanism is also of particular advantage in providing compactness and low weight while at the same time allowing for simple assembly.

I claim:

1. A damping device for an aircraft rotor having a cylinder, a piston member, a fluid reservoir, a channel leading from said cylinder to said reservoir, a check valve in said channel allowing free flow of fluid from said reservoir to said cylinder when the pressure in said cylinder is lower than the pressure in said reservoir, an orifice in said check valve to allow restricted flow from said cylinder to said reservoir under cylinder pressure, a movable seat member against which said check valve seats, and spring means retaining said seat member against a fixed seat thereby providing for limiting the pressure in said cylinder to a predetermined value.

2. A damping device for an aircraft rotor having a cylinder, a piston member, a fluid reservoir, a channel leading from said cylinder to said reservoir, a valve body having a light spring contacting it to provide a check valve which opens to allow flow from said reservoir to said cylinder when the pressure in the cylinder is lower than in the reservoir, and a second valve body having a heavy spring contacting it to provide a pressure relief valve which opens to allow flow from said cylinder to said reservoir at a predetermined pressure, one of said valve bodies being provided with a female seat against which the other of said valve bodies makes contact, and a restrictive orifice in one of said valve bodies.

3. A damping device for an aircraft rotor having a cylinder, a piston member, a fluid reservoir, a channel leading from said cylinder to said reservoir, a valve body having a light spring contacting it to provide a check valve which opens to allow flow from said reservoir to said cylinder when the pressure in the cylinder is lower than in the reservoir, and a second valve body having a heavy spring contacting it to provide a pressure relief valve which opens to allow flow from said cylinder to said reservoir at a predetermined pressure, one of said valve bodies being provided with a female seat against which the other of said valve bodies makes contact, and a restrictive orifice in the valve body which contacts said female seat.

4. A damping device for an aircraft rotor having a cylinder, a piston member, a fluid reservoir, a channel leading from said cylinder to said reservoir, a valve body having a light spring contacting it to provide a check valve which opens to allow flow from said reservoir to said cylinder when the pressure in the cylinder is lower than in the reservoir, and a second valve body having a heavy spring contacting it to provide a pressure relief valve which opens to allow flow from said cylinder to said reservoir at a predetermined pressure, one of said valve bodies being provided with a female seat against which the other of said valve bodies makes contact.

5. In combination, an aircraft rotor having blades pivoted for limited motion about an axis parallel to the main rotor axis, and a damping device therefor comprising fluid-containing, telescoping parts, one of which is attached to a blade of the rotor and the other of which is attached to another part of the rotor structure so that the line of reciprocation of the said telescoping parts is substantially parallel to the plane of rotation of said blades, and a fluid reservoir on the outer of said telescoping parts extending upwardly therefrom with its free end inclined toward the axis of rotation of said rotor.

6. An aircraft rotor having blades pivoted for lead-lag movement about a substantially vertical axis, a hydraulic damping device having telescoping parts including a cylinder and a piston, mounting means attached to said cylinder having a substantially vertical pivot axis, a mounting member having a substantially vertical pivot supporting said cylinder by its mounting means, a fluid reservoir attached to said cylinder and having its axis inclined upwardly and inwardly when said cylinder is supported in operative position on said member.

7. A hydraulic damping unit for an aircraft rotor including a body member having a cylindrical bore chamber, a piston mounted in said chamber for double acting damping motions therein, said body member having two fluid channels each having its axis parallel to the axis of said chamber, a fluid reservoir associated with said body member at approximately the longitudinal center thereof, a fluid connection between said reservoir and the middle of each parallel channel, a fluid connection from each channel to each end of said chamber, valve means in each channel between the reservoir connection and the chamber connection, the valve means in one channel being adapted to allow substantially unrestricted flow from said reservoir to said chamber, said valve means including an imperforate body, and the valve means in the other channel also having an imperforate body adapted to provide flow from said chamber to said reservoir only upon development of a predetermined pressure in said chamber.

HARRIS S. CAMPBELL.

REFERENCES CITED

The following references are of record in the file of this patent:

UNITED STATES PATENTS

| Number | Name | Date |
| --- | --- | --- |
| 456,016 | Canet | July 14, 1891 |
| 1,291,016 | Kellogg | Jan. 14, 1919 |
| 1,614,657 | Cotton | Jan. 18, 1927 |
| 1,836,381 | McNab | Dec. 15, 1931 |
| 1,899,096 | Larsen | Feb. 28, 1933 |
| 1,948,457 | Larsen | Feb. 20, 1934 |
| 2,003,010 | Nixon | May 28, 1935 |
| 2,046,889 | Wyeth et al. | July 7, 1936 |
| 2,239,112 | Nickelsen | Apr. 22, 1941 |
| 2,318,260 | Sikorsky | May 4, 1943 |
| 2,554,774 | Buivid | May 29, 1951 |